May 26, 1964 H. H. BROWN 3,134,829
PROCESS FOR PRODUCING WOOD GRAINED FLOOR TILE
Filed Aug. 7, 1958 2 Sheets-Sheet 1

INVENTOR.
HILTON H. BROWN
BY Edward J. Willey
ATTORNEY

United States Patent Office 3,134,829
Patented May 26, 1964

3,134,829
PROCESS FOR PRODUCING WOOD GRAINED FLOOR TILE
Hilton H. Brown, Matteson, Ill., assignor, by mesne assignments, to The Flintkote Company, a corporation of Massachusetts
Filed Aug. 7, 1958, Ser. No. 753,827
1 Claim. (Cl. 264—76)

This invention relates to a process for producing a wood grain floor tile and more particularly a process for producing a plastic composition floor tile having a wood grained effect in the surface thereof.

Composition tiles of the so-called asphalt or plastic type are usually made with a resin, a plasticizer for the resin, and a filler. The filler which may be asbestos, limestone or other mineral filler, usually exceeds 50% by weight of the tile. The resin may be any of a number of synthetic resins or may include rosin, rosin pitch or rosin derivatives. The tiles which are known as asphalt tiles may contain asphalt as the resin but sometimes do not contain any asphalt.

Substantially all of the tile manufactured commercially contains colored pigment and it has been customary to marbleize the pigmented material. The marbleizing has been accomplished by mixing chips of previously compounded tile with a pigmented base composition which is different in color than the chips. The whole mix is heated and agitated and the mass is then calendered whereby the added chips form streaks in the base material which have the appearance of marbelizing. In certain colors this marbelizing may have somewhat the appearance of wood grain.

It is an object of the present invention to provide an improved process for manufacturing a wood grained composition floor tile.

It is a further object of the present invention to provide an improved process for manufacturing a wood grained composition floor tile which does not utilize the marbleizing process.

These and other objects are attained by the present invention a specific embodiment of which will hereinafter be set forth but it will be understood that variations and substitutions may be made within the scope of the claim.

Figures 1, 2:
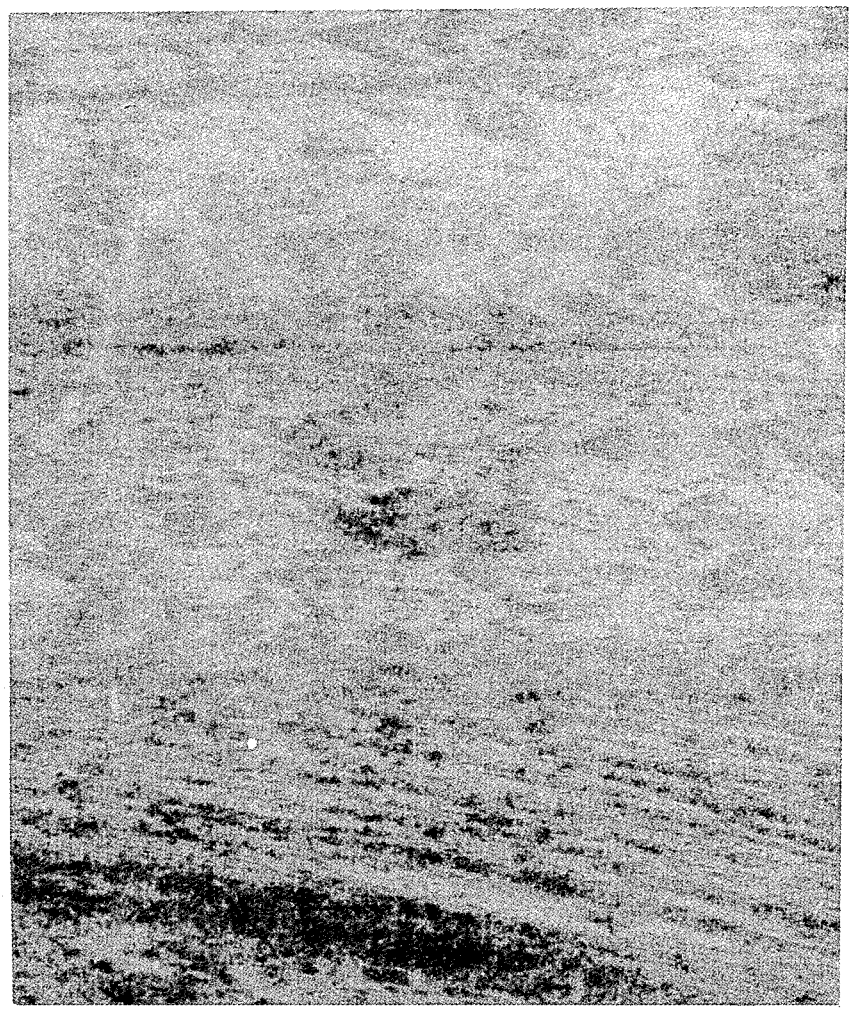
FIG. 1 is a plan view of a tile made in accordance with the present invention.
FIG. 2 is a cross-sectional view of the tile shown at FIG. 1.
Figure 3:
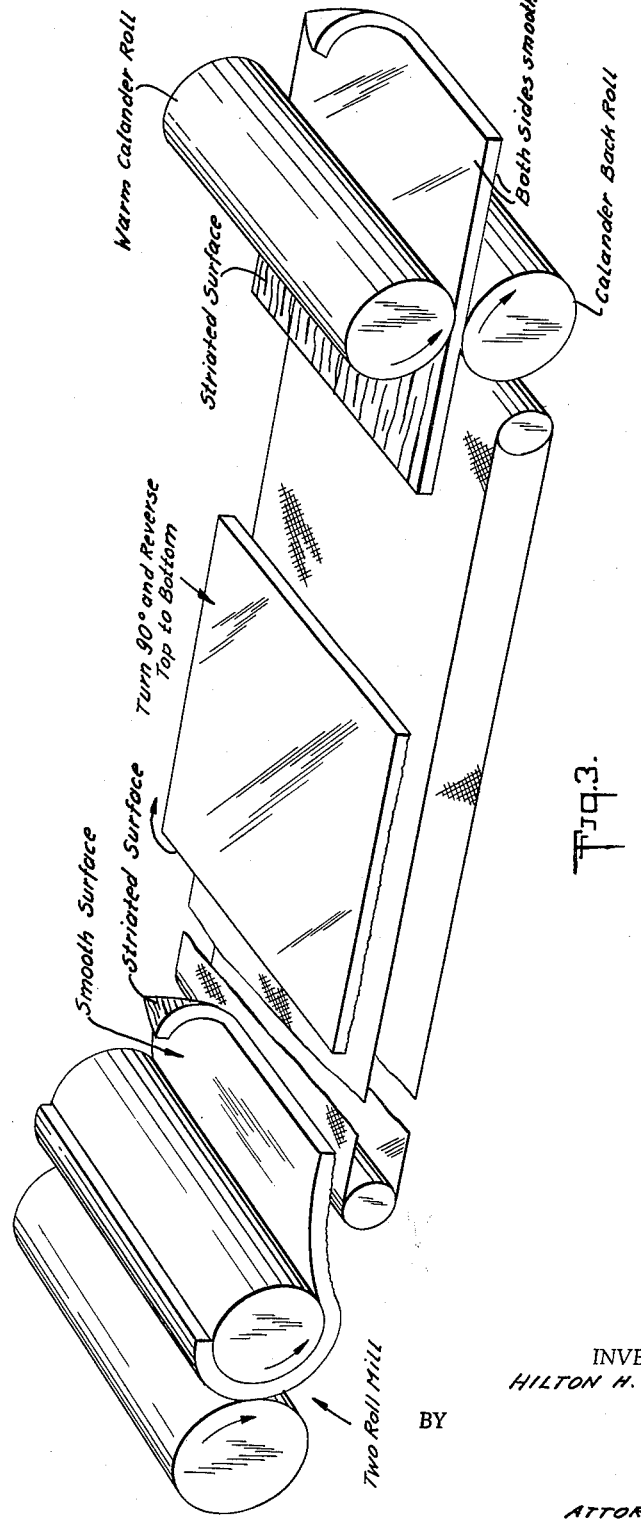
FIG. 3 is a schematic view showing the process for manufacturing the tile of FIGS. 1 and 2 in accordance with the invention.

It will be noted by reference to FIG. 1 of the drawings that a unique wood grained effect is achieved by the present invention. In general this effect is produced by first placing the tile formulation on a two-roll mill. On the two-roll mill the mass will sheet onto the cooler of the two rolls. The material is then removed by the use of a doctor blade and in the process of this removal the surface of the composition which was not adjacent the roll becomes wrinkled and it is these wrinkles which are utilized to produce the grained effect. The sheet is then passed through calender rolls at right angles to the direction of the sheet in the two-roll mill. In other words, in passing through the calender the wrinkles are at right angles to the axis of the calender rolls. Calendering is best accomplished for the present purpose at temperatures lower than normal.

It is also generally desirable for the present invention to utilize a low pigmentation formula wherein the pigment may be less than 1% and may be even entirely absent from the formulation. The composition may be mixed on the two-roll mill or it may be premixed in any mixer commonly used in the art, such as for example, a Banbury mixer or a Baker-Perkins mixer and then subsequently placed on the two-roll mill.

The following is an example of a specific composition prepared in accordance with the present invention.

| | Percent by weight |
|---|---|
| Vinyl chloride-acetate resin | 18.63 |
| Di-octyl phthalate | 6.65 |
| Stabilizer (polyol) | 1.16 |
| 7R asbestos | 13.30 |
| Fibrous talc | 13.30 |
| Calcium carbonate | 46.56 |
| Burnt umber | .40 |

The ingredients were blended on a Banbury mixer and then placed on a heated two-roll mill having a gap between the rolls of ⅜ inch. When the temperature of the batch reached 250° F., it was removed from the cooler of the two rolls by means of a doctor blade. It was then placed with the wrinkled side upwardly into calender rolls after being turned at right angles so that the wrinkles or ripples in the upper surface were perpendicular to the axis of the calender rolls. The calender rolls were heated to 100° F. and 150° F., which is at least 30° lower than usual. After calendering to a thickness of ⅛" the sheet was cut into strips 4" x 24". The sheet may also be cut into squares for a parquet effect. These were then laid in end to end relationship in rows and had an appearance of a wood floor with a beautiful soft texture.

In general, the proportions of resin, plasticizer and filler are those commonly used in the production of floor tiles. The filler which may, for example, be asbestos, limestone or both, or other mineral filler, generally constitutes from 60–80% by weight of the tile and preferably from 65–75% by weight of the tile. Pigments used to produce the desired color effect include, for example, titanium oxide, carbon black, iron oxide, chromium oxide, phthalocyanine, etc. These factors are not peculiar to this invention but are well known in the production of plastic tile. The binder portion of the tile generally contains a synthetic resin such as coumarone-indene, styrene or a mixture, but may contain any of a wide variety of other resins including rosin, vinyl chloride, vinyl acetate, etc. The proportions of plasticizer together with resin make up the balance of the tile, or, in other words, from 20–40% by weight of the tile and preferably 25–35%. The relation of plasticizer to resin is generally from 50–80% resin and from 50–20% plasticizer based on the combined plasticizer-resin.

In the present process the temperature of the calender rolls is important and it may generally be said that they are maintained at a temperature about 20–30° F. lower than is customary for the same batch. For example, with the vinyl formulation above the first set of calender rolls is preferably heated at 120–140° F. for the hot roll and 100° F. for the back roll. The succeeding calender rolls should be kept to temperatures below 150° F. for the surface forming rolls and 100° F. for the back rolls.

It will be understood that the present method eliminates the manufacturing and handling of contrasting colored tile ordinarily used in the marbleizing technique. Furthermore, the process produces a homogeneous tile of very pleasing appearance.

I claim:

A method for obtaining a wood grained type plastic floor tile having at least two shades of the same color on the surface thereof, formed from a composition of a substanially homogeneous filled plastic of a single color without marbleizing chips comprising mixing a floor tile composition into a substantially homogeneous mass, placing the mass on a two-roll mill, removing the sheet from a roll of the two-roll mill by the means of a doctor blade and calendering the sheet at a direction of right angles to the sheet direction with the wrinkle side of the sheet facing the warmer of two calender rolls, both of said calender rolls being cooler than those which would be used for calendering the same composition.

References Cited in the file of this patent

UNITED STATES PATENTS

| | | |
|---|---|---|
| 1,929,045 | Fredriksen | Dec. 12, 1933 |
| 2,369,866 | Spencer | Feb. 20, 1945 |
| 2,370,536 | Hartman | Feb. 27, 1945 |